(12) United States Patent
Derendarz et al.

(10) Patent No.: US 10,875,576 B2
(45) Date of Patent: Dec. 29, 2020

(54) METHOD FOR THE AUTOMATED DRIVING OF A VEHICLE, IN PARTICULAR OF A MOTOR VEHICLE, IN ORDER TO APPROACH A PARKING POSITION

(71) Applicant: VOLKSWAGEN AKTIENGESELLSCHAFT, Wolfsburg (DE)

(72) Inventors: Wojciech Waclaw Derendarz, Braunschweig (DE); Peter Mühlfellner, Zurich (CH); Sebastian Grysczyk, Braunschweig (DE); Lutz Junge, Braunschweig (DE); Rene Waldmann, Meine (DE); Stefan Wonneberger, Braunschweig (DE); Thomas Holleis, Zurich (CH); Stefan Brüning, Berlin (DE); Sven Horstmann, Berlin (DE); Clemens Brummer, Berlin (DE); Marc Bartholomaeus, Berlin (DE); Martin Stellmacher, Falkensee (DE); Marcel Nicklas, Chemnitz (DE); Fabian Pucks, Berlin (DE); Carsten Last, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 266 days.

(21) Appl. No.: 15/753,637

(22) PCT Filed: Jul. 7, 2016

(86) PCT No.: PCT/EP2016/066113
§ 371 (c)(1),
(2) Date: Feb. 20, 2018

(87) PCT Pub. No.: WO2017/041927
PCT Pub. Date: Mar. 16, 2017

(65) Prior Publication Data
US 2018/0281859 A1    Oct. 4, 2018

(30) Foreign Application Priority Data
Sep. 8, 2015  (DE) .................. 10 2015 011 486
Jun. 22, 2016 (DE) .................. 10 2016 211 184

(51) Int. Cl.
*B62D 15/02* (2006.01)
*G08G 1/16* (2006.01)
(Continued)

(52) U.S. Cl.
CPC ......... *B62D 15/0285* (2013.01); *B60W 30/06* (2013.01); *G05D 1/0285* (2013.01);
(Continued)

(58) Field of Classification Search
CPC ..... B62D 15/0285; B60W 30/06; G08G 1/14; G08G 1/144; G08G 1/168
(Continued)

(56) References Cited

U.S. PATENT DOCUMENTS 8,554,465 B2   10/2013   Schoenherr et al.
10,011,274 B2   7/2018   Holland-Letz
(Continued)

FOREIGN PATENT DOCUMENTS

CN   101830226 A   9/2010
CN   102034366 A   4/2011
(Continued)

OTHER PUBLICATIONS

Search Report for International Patent Application No. PCT/EP2016/066113, dated Sep. 26, 2016.

*Primary Examiner* — Peter D Nolan
*Assistant Examiner* — Luat T Huynh
(74) *Attorney, Agent, or Firm* — Barnes & Thornburg LLP

(57) ABSTRACT

A method for the automated driving of a transportation vehicle to approach a parking position which includes providing a trajectory for a controller of the transportation vehicle and generating signals for controlling a movement of the transportation vehicle along the trajectory provided, wherein the provision of the trajectory includes determining a current position of the transportation vehicle by a position-determining device, setting up a communication link to a server outside the transportation vehicle by a communication device, transmitting the current determined position of the transportation vehicle to the server via the communication link, retrieving and receiving at least one trajectory, stored at the server, via the communication link, wherein the retrieved and received trajectory runs at least through a tolerance range about the current determined position of the transportation vehicle. Also disclosed is a transportation vehicle device, a method for operating a system, and an associated system.

17 Claims, 4 Drawing Sheets

(51) Int. Cl.
| | | |
|---|---|---|
| *G08G 1/14* | (2006.01) | |
| *B60W 30/06* | (2006.01) | |
| *G05D 1/02* | (2020.01) | |

(52) U.S. Cl.
CPC .............. *G08G 1/14* (2013.01); *G08G 1/144* (2013.01); *G08G 1/168* (2013.01); *G05D 2201/0213* (2013.01)

(58) Field of Classification Search
USPC .......................................................... 701/25
See application file for complete search history.

(56) References Cited

U.S. PATENT DOCUMENTS

| | | | |
|---|---|---|---|
| 2010/0156672 A1 | 6/2010 | Yoo et al. | |
| 2011/0093846 A1* | 4/2011 | Moinzadeh | B60R 25/00 717/178 |
| 2011/0273310 A1* | 11/2011 | Kadowaki | B62D 15/0285 340/932.2 |
| 2012/0188100 A1 | 7/2012 | Min et al. | |
| 2015/0217763 A1* | 8/2015 | Reichel | B60W 50/0098 701/23 |
| 2016/0368489 A1* | 12/2016 | Aich | B60W 30/06 |

FOREIGN PATENT DOCUMENTS

| | | |
|---|---|---|
| CN | 102481951 A | 5/2012 |
| DE | 102010049585 A1 | 4/2012 |
| DE | 102012200068 A1 | 7/2013 |
| DE | 102013015349 A1 | 4/2014 |
| DE | 102013222071 A1 | 4/2015 |
| WO | 2015096838 A1 | 7/2015 |

\* cited by examiner

METHOD FOR THE AUTOMATED DRIVING OF A VEHICLE, IN PARTICULAR OF A MOTOR VEHICLE, IN ORDER TO APPROACH A PARKING POSITION

PRIORITY CLAIM

This patent application is a U.S. National Phase of International Patent Application No. PCT/EP2016/066113, filed 7 Jul. 2016, which claims priority to German Patent Application Nos. 10 2015 011 486.7, filed 8 Sep. 2015, and 10 2016 211 184.1, filed 22 Jun. 2016, the disclosures of which are incorporated herein by reference in their entireties.

SUMMARY

Illustrative embodiments relate to a method for the automated driving of a transportation vehicle, in particular of a motor vehicle, to approach a parking position. Illustrative embodiments further relate to an associated transportation vehicle device, an associated method for operating a system, and a system for the automated driving of a transportation vehicle, in particular of a motor vehicle, to approach a parking position.

BRIEF DESCRIPTION OF THE DRAWINGS

The disclosed embodiments are explained in detail below with reference to the drawings, in which.

DETAILED DESCRIPTION

Figure 1:
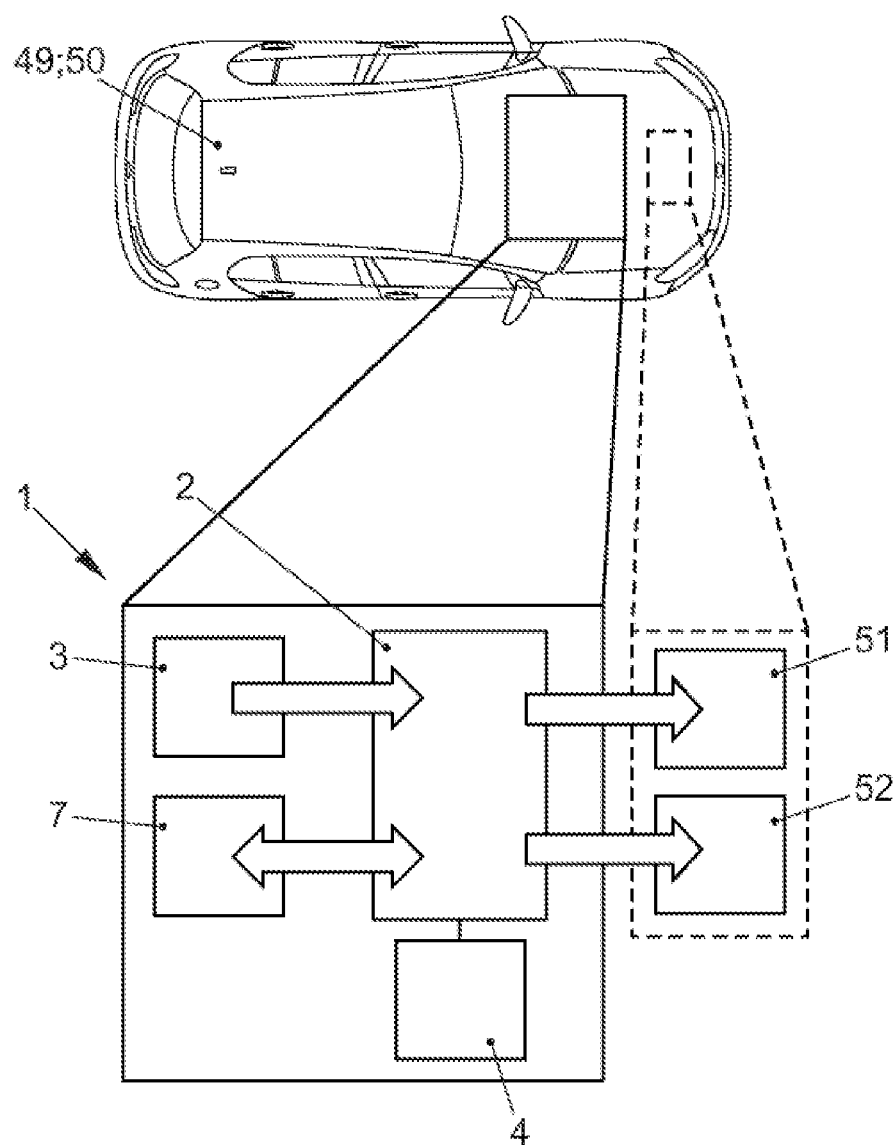
FIG. 1 shows a schematic representation of an example embodiment of a transportation vehicle device for the automated driving of a transportation vehicle to approach a parking position.

Modern transportation vehicles, in particular motor vehicles, have a multiplicity of assistance systems which support a driver in driving the transportation vehicle. Braking assistants, for example, lane-keeping assistants and distance-maintaining assistants are used.

A method is known from DE 10 2012 200 068 A1 for operating a driver assistance system of a transportation vehicle, comprising the following operations: receiving environment data transmitted to the transportation vehicle, using the received environment data for a decision as to whether the driver assistance system should or should not provide a driver assistance function, wherein the used data are intended to be archived. A driver assistance system for a transportation vehicle, a system for operating a driver assistance system for a transportation vehicle and a computer program are furthermore described.

It is furthermore known to guide a transportation vehicle in an automated manner along a provided trajectory into a parking position. To do this, the steering and the drive of the transportation vehicle are controlled by a controller in such a way that the transportation vehicle is guided along the provided trajectory into the parking position. A method of this type is known, for example, from DE 10 2013 015 349 A1.

The disclosure is based on the technical problem of providing a method, a transportation vehicle device, a method for operating a system and a system for the automated driving of a transportation vehicle to approach a parking position, in which the provision of the trajectory is improved.

The disclosed embodiments provide a method, a transportation vehicle device, a method for operating a system, and a system.

A trajectory is intended below to comprise an ordered quantity of parameterized position data of a path curve in an environment and further data. These further data may be features present in the environment and/or features derived therefrom, for example, visual images, metadata or position data of physical objects in the environment. The further data are intended to allow a localization of the transportation vehicle in the environment which is improved compared with satellite-supported global positioning and navigation systems (e.g., GPS).

It can be provided that a trajectory comprises environment location data which enable a sensor system of the transportation vehicle to localize itself precisely in the environment of the transportation vehicle. A localization of the transportation vehicle in terms of the position may be performed with an accuracy of around +/−10 cm and an orientation accuracy of around +/−1°, optionally with a precision accuracy of +/−5 cm and an orientation accuracy of around +/−0.5° or better.

A transportation vehicle is intended below to designate a land vehicle. A transportation vehicle is intended to designate a motor vehicle for the driven transportation of persons or goods on roads.

The background to the disclosure is represented by assistance systems which enable a transportation vehicle to learn a trajectory in a learning drive and to follow the learnt trajectory in an automated manner in a subsequent drive.

The core idea of the disclosed embodiments is to provide a central management for learnt trajectories of an assistance system for the automated driving of a transportation vehicle into a parking position. A trajectory from a starting position, for example, an entrance to a property, through to a parking position, for example, a garage parking space, is recorded for a transportation vehicle and stored on a server. It is then provided that the current position of the transportation vehicle is transmitted to the server in a later subsequent drive. The server then searches for trajectories which comprise one or more position data which lie in a tolerance range in relation to the current/transmitted position. Here, the tolerance range represents a specified environment around the current position, for example, a surrounding area with a radius of 20 or 50 m. Trajectories are taken into account here which pass through the tolerance range and into which the transportation vehicle is transferable from its current position by a movement that is possible for the transportation vehicle. A possible movement is intended to be a movement on a constantly differentiable path curve which has no abrupt changes of direction (kinks). The server transmits the found trajectories to the transportation vehicle. A selection of one of the trajectories then takes place in the transportation vehicle, for example, by a driver or on the basis of further criteria. The selected trajectory is then subsequently followed by the transportation vehicle in an automated manner. In the disclosed embodiments, the management of stored trajectories is improved. These may be made available, for example, publicly are only under specific conditions. Generally speaking, the management is optimized through a centralized storage and provision of trajectories on the server, and convenience and flexibility in the automated driving to parking positions are improved. Furthermore, the number of stored trajectories is no longer limited by a memory in the respective transportation vehicle.

In a first embodiment, a method is provided for the automated driving of a transportation vehicle, in particular of a motor vehicle, to approach a parking position, comprising the following operations: providing a trajectory for a controller of the transportation vehicle, generating signals to control a movement of the transportation vehicle along the provided trajectory, wherein the provision of the trajectory comprises the following operations: determining a current position of the transportation vehicle by a position-determining device, setting up a communication connection to a server outside the transportation vehicle by a communication device, transmitting the determined current position of the transportation vehicle to the server via the communication connection, retrieving and receiving at least one trajectory stored on the server via the communication connection, wherein the retrieved and received trajectory passes at least through a tolerance range around the determined current position of the transportation vehicle.

Furthermore, according to a second embodiment, a transportation vehicle device is provided for a transportation vehicle for the automated driving of the transportation vehicle, in particular of a motor vehicle, to approach a parking position, comprising a controller which is designed in such a way as to generate signals for controlling a movement of the transportation vehicle along a provided trajectory, wherein the transportation vehicle device comprises a position-determining device and a communication device, wherein the position-determining device is designed in such a way as to determine the current position of the transportation vehicle, and wherein the controller is furthermore designed in such a way as to set up a communication connection to a server outside the transportation vehicle via the communication device, to transmit the determined current position of the transportation vehicle to the server, and to retrieve and receive at least one trajectory stored on the server via the communication connection.

In a third embodiment, a method is provided for operating a system for the automated driving of at least one transportation vehicle, in particular of a motor vehicle, comprising the following operations: carrying out the method described in the first embodiment by at least one transportation vehicle and carrying out the following operations in a server: receiving a current position of the at least one transportation vehicle via a communication connection to the at least one transportation vehicle, searching for and providing at least one stored trajectory, wherein the stored trajectory passes at least through a tolerance range around the received current position of the at least one transportation vehicle, transmitting the found and provided at least one stored trajectory via the communication connection to the at least one transportation vehicle.

In a final embodiment, a system is provided for the automated driving of a transportation vehicle, in particular of a motor vehicle, to approach a parking position, comprising at least one transportation vehicle with a transportation vehicle device according to the second embodiment, wherein the system comprises a server, wherein the server is designed in such a way as to receive the determined current position of the at least one transportation vehicle via the communication connection, to search for and provide at least one stored trajectory, wherein the provided at least one trajectory passes at least through a tolerance range around the received current position of the at least one transportation vehicle, and to transmit the provided at least one stored trajectory via the communication connection to the at least one transportation vehicle.

The trajectories stored in the server may, for example, be stored in a map maintained in the server. Individual areas and positions on the map have, for example, unique allocations to global positions. The stored trajectories are then allocated to the corresponding global positions.

Along with the current position of the transportation vehicle, further criteria may be relevant to the search for stored trajectories. Preferences of a driver or passenger of the transportation vehicle, for example, may be present which are intended to be taken into account in the provision of a stored trajectory for an automated drive. In at least one disclosed embodiment, it is therefore provided that at least one selection criterion is transmitted to the server in addition to the current position of the transportation vehicle. The server can then further restrict a selection of searched for, stored trajectories by the selection criterion.

Similarly, it is provided in at least one disclosed embodiment of the method for operating the system, that the at least one selection criterion of the at least one transportation vehicle is received by the server and the search for and provision of the at least one stored trajectory are carried out depending on the received selection criterion.

A selection criterion of this type may be individualization information which individually characterizes or identifies the transportation vehicle or the driver or passenger of the transportation vehicle. Individualization information of this type may, for example, be a user identifier or a user account, similar to those that are widespread on the Internet. However, individualization information of this type may, for example, also be an identifier allocated to the transportation vehicle, for example, a transportation vehicle number or the identifier on a number plate of the transportation vehicle. It is therefore provided in at least one disclosed embodiment that the at least one selection criterion comprises individualization information. After receiving the individualization information, the server is able, for example, to search for and provide individually adapted trajectories for the transmitted individualization information. In this way, it is possible, for example, to allocate differently preferred parking spaces to a plurality of users of a garage, whereby only those stored trajectories which correspond to the preferences of the user are then searched for and transmitted to the transportation vehicle for the corresponding user on the basis of the transmitted individualization information.

However, it may furthermore also be provided that the individualization information is designed differently. Thus, for example, individualization of this type may be allocated to a stored trajectory or a group of stored trajectories. In this way, it is possible, for example, to transmit individualized information together with an invitation and thereby allocate, to the transportation vehicle of an invited guest, a parking space or a parking space area on a property otherwise unknown to the guest. Parking spaces in an underground car park, a multi-story car park or other parking spaces can be allocated accordingly. It is also possible, in the event of a change of transportation vehicle, to provide a driver nevertheless with a trajectory which is always identical.

It may furthermore also be provided that the selection criterion describes a state of the transportation vehicle or the environment of the transportation vehicle, so that, depending on the state, a different stored trajectory is provided. It is therefore provided in at least one disclosed embodiment that the at least one selection criterion comprises a state parameter. A state parameter of this type may, for example, be a prevailing weather condition, a state of the road or a state of the transportation vehicle. A prevailing weather condition may be determined, for example, via a rain sensor fitted in the transportation vehicle, a brightness sensor or a switching state of the rear windscreen heater or the windscreen wipers. A state of the road may be identified, for example, by a slip identification (e.g., via an evaluation of the measurement data of an electronic stability control, etc.). A state of the transportation vehicle may, for example, be a loading of the transportation vehicle, so that, in the case of a loaded transportation vehicle, for example, stored trajectories which complicate or impede an unloading of the transportation vehicle are excluded. A loading state of this type may be determined, for example, via corresponding sensors on the bumpers of the transportation vehicle.

A state parameter may, for example, also be a time of the day, a specific day in the week or in the month, or a specific time of the year. In this way, it becomes possible, for example, to provide different trajectories on different days of the week and thereby approach different parking positions. It may thus be possible, for example, to use a different parking space at weekends compared with in the week. If, for example, specific features in the environment of the transportation vehicle are more difficult to detect and recognize on rainy days compared with days with better weather, trajectories can be provided selectively for rainy days and sunny days, so that a trajectory with optimum further data is always provided. A curbside, for example, may thus form an easily recognizable feature on dry days; conversely, if it is raining heavily, a puddle may completely submerge the curb, so that only the surface of the puddle is visible and the easily recognizable feature of the curbside has disappeared. A trajectory with other features (or further data) is then used accordingly on rainy days.

More than one trajectory may also be stored for the surrounding area of a current position of the transportation vehicle. This is the case, for example, if a transportation vehicle is located at the entrance to a property and has the possibility of approaching both the left and right garage space of a double garage. If a plurality of possibilities exist, a selection must be made. In a further disclosed embodiment, it is therefore provided that, if a further trajectory is retrieved and received in addition to the at least one retrieved and received trajectory, one of these trajectories is selected by the controller depending on a selection parameter.

It is provided here that the selection parameter is derived from a detected user interaction, wherein the at least one retrieved and received trajectory and the further retrieved and received trajectory are offered to a user for selection before a detection of the user interaction. The received trajectories can be displayed to the user, for example, on a display and operating device, so that the user can make a selection of the required trajectory or parking position there. The selected trajectory is then supplied to the controller and is subsequently followed in an automated manner. A display and operating device of this type may, for example, be a multimedia console in the transportation vehicle. However, it may also be provided that the display and operating device is a Smartphone or a tablet computer. The user can then select one of the trajectories in a convenient manner, for example, by selecting a graphical representation of the trajectories.

An environment may change over time, whereby, for example, physical objects may change their location, disappear completely or reappear. It may therefore occur that the further data stored for a trajectory are no longer up-to-date and must be updated. It is therefore provided in at least one disclosed embodiment that trajectory data of the trajectory of the transportation vehicle are acquired via acquisition mechanisms and are recorded by the controller and transmitted via the communication connection to the server.

It is then provided here that the server updates the corresponding stored trajectory. It is therefore provided that trajectory data are received by the server for a trajectory recorded in the at least one transportation vehicle and are stored in the server or a trajectory stored in the server is updated and/or supplemented by the received trajectory data.

Following the reception of the at least one stored trajectory, it can be provided to store the received data in a buffer memory. It is therefore provided in at least one disclosed embodiment that the at least one trajectory received from the server is stored in a buffer memory in the transportation vehicle. This offers the benefit that the trajectory data of the at least one stored trajectory are retained even in the event of possibly occurring problems with the communication connection and are available to the transportation vehicle device so that an automated drive to the parking position can still be performed. A further benefit of a storage of the trajectory in the buffer memory is that a subsequent departure from the parking position at least along the stored at least one trajectory always remains possible, even if the communication connection to the server is not set up and a reception of further (alternative) trajectories is not possible as a result. For this purpose, the transportation vehicle device comprises, for example, a buffer memory, for example, a RAM memory provided for this purpose or an area in a RAM memory, for example, in the RAM memory of the controller. A non-volatile flash memory or a hard disk can furthermore also be provided for this purpose.

Conversely, in a further disclosed embodiment, it is provided that the trajectory data of the at least one stored trajectory are transmitted continuously to the transportation vehicle, for example, whereby the associated trajectory data for a current position of the transportation vehicle are always transmitted in real time or with a slight data buffering for a current position of the transportation vehicle.

Depending on the environment and the length of the trajectory, the trajectory data of the stored trajectories could comprise large data volumes. In the case where partially common sections have to be driven for a property or multi-story car park to reach different parking positions, the trajectory data are identical for the common section, so that redundant data are largely present for this section. In a further disclosed embodiment, it is therefore provided that a plurality of trajectories stored for an area are combined by the server to form a trajectory tree, insofar as the plurality of trajectories have common sections, and are provided accordingly by the server as a trajectory tree also and are transmitted to the at least one transportation vehicle. A data reduction can thereby be achieved, so that bandwidth and data volume can be saved. A memory requirement in the server can similarly be reduced as a result.

It can then furthermore be provided that the trajectory tree is presented on a display and operating device in the transportation vehicle for the selection of one of the stored trajectories transmitted as a trajectory tree. This enables a clear presentation and a convenient selection of the desired parking position by a user interaction of the user.

FIG. 1 shows a schematic representation of an embodiment of a transportation vehicle device 1 for the automated driving of a transportation vehicle 49, in this case a motor vehicle 50, to approach a parking position. The transportation vehicle device 1 comprises a controller 2, a position-determining device 3 and a communication device 4. Here, the controller 2, the position-determining device 3 and the communication device 4 may also be designed as parts of the infrastructure of the motor vehicle 50, for example, an on-board computer already installed in the motor vehicle 50, a navigation system or a mobile telecommunication device, etc. The position-determining device 3 may, for example, be a global position-determining device (e.g., GPS). The communication device 4 may, for example, be a car-to-infrastructure connection, for example, by a mobile telecommunication connection or a WLAN network. The controller 2 is designed in such a way as to control a longitudinal adjustment 51 and a transverse adjustment 52 of the motor vehicle 50 by corresponding signals to effect a movement of the motor vehicle 50 along a provided trajectory. The provided trajectory may be stored in a buffer memory 7.

Figure 2:
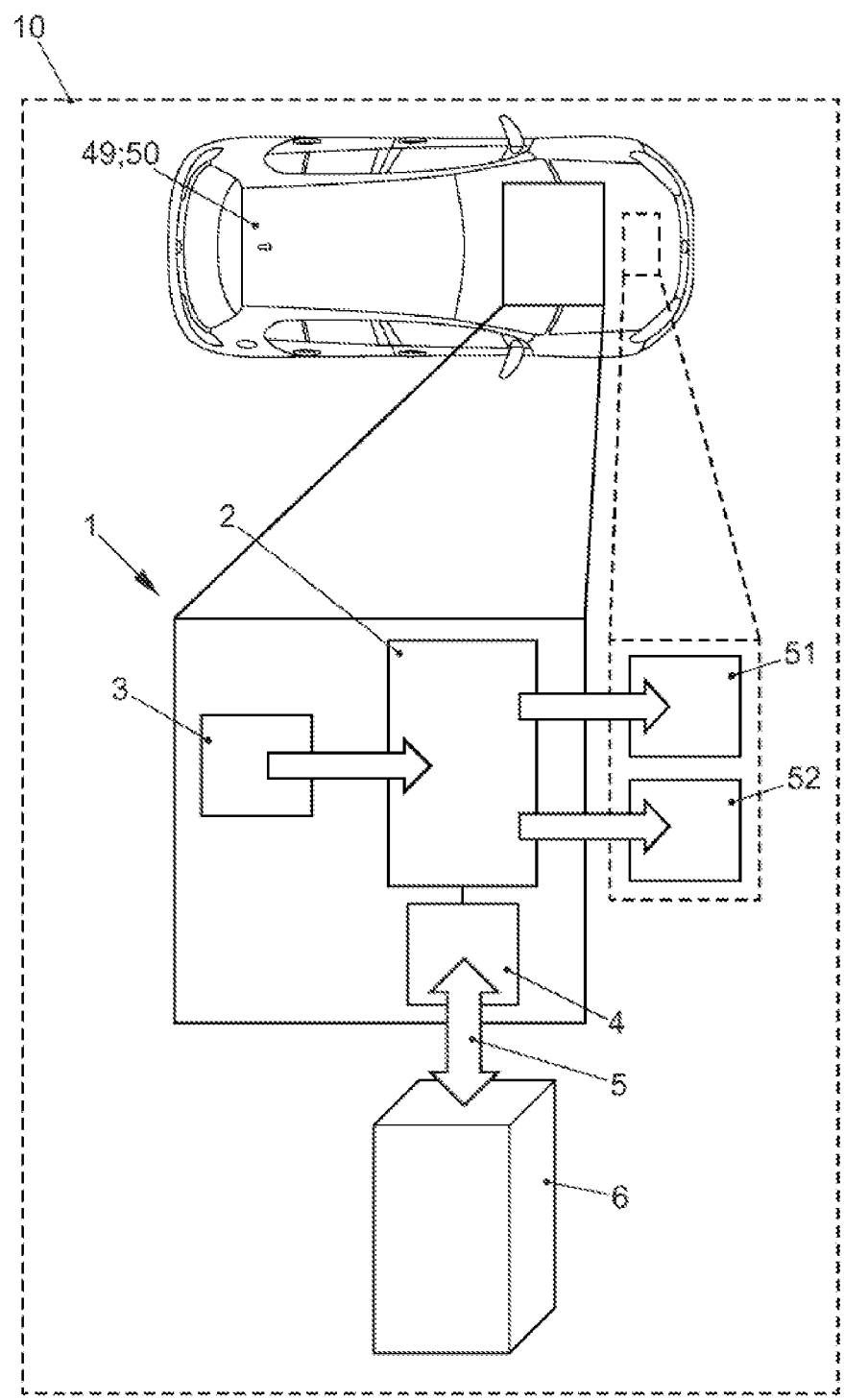
FIG. 2 shows a schematic representation of a system for the automated driving of a transportation vehicle to approach a parking position.

FIG. 2 shows a schematic representation of a system for the automated driving of the motor vehicle 50 to approach a parking position. The same reference numbers also denote the same features or terms. The system 10 comprises at least one transportation vehicle 49, here a motor vehicle 50, with a transportation vehicle device 1 as shown in FIG. 1 and a server 6. The transportation vehicle device 1 can furthermore set up a communication connection 5, for example, as a mobile telecommunication connection (GSM, EDGE, UMTS, LTE) or a WLAN connection, etc., via the communication device 4 to the server 6.

Figure 3:
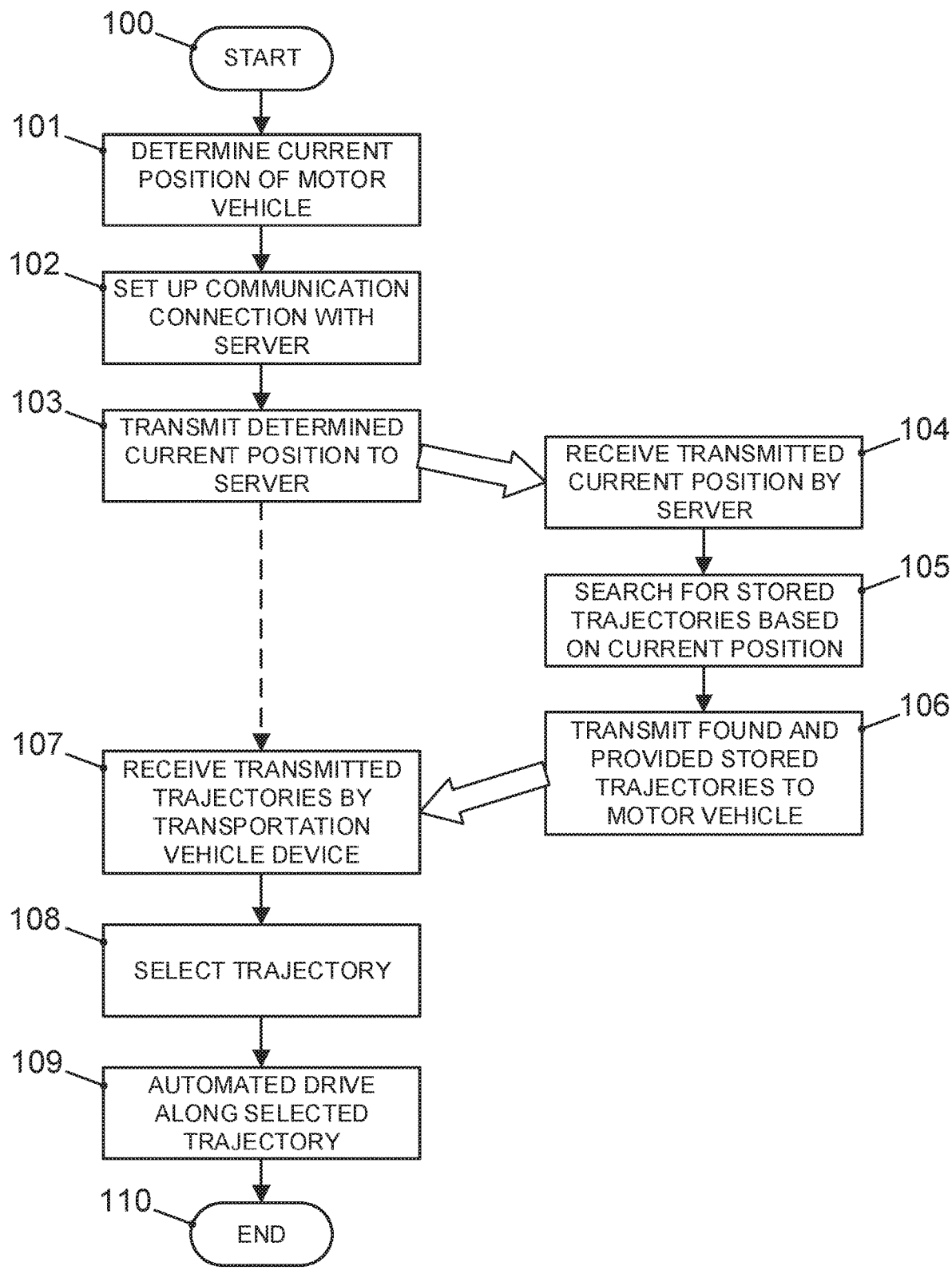
FIG. 3 shows a schematic flow diagram of the method for operating a system for the automated driving of at least one transportation vehicle.

FIG. 3 shows a schematic flow diagram of the method for operating the system 10 for the automated driving of at least one motor vehicle 50. The reference numbers used below also refer to terms or features in FIGS. 1 and 2.

After the start 100 of the method, a current position of the motor vehicle 50 is determined in a first method operation at 101 by the position-determining device 3 of the transportation vehicle device 1 of the motor vehicle 50. Compared with a subsequent localization on the basis of the features in the environment stored in the trajectory, the current position is only a rough estimate and is to be regarded as an initial position definition of the current position of the transportation vehicle.

In the next method operation at 102, a communication connection 5 is then set up by the controller 2 via the communication device 4 to the server 6. In a following method operation at 103, the determined current position of the motor vehicle 50 is transmitted by the controller 2 via the communication connection 5 to the server 6.

It can furthermore be provided that at least one selection criterion is additionally transmitted to the server 6. A selection criterion of this type may, for example, be individualization information, for example, an identifier of the motor vehicle 50 or a user identifier. State information, for example, a weather condition state or a time of day, a day of the week, a month or a time of the year may also form a selection criterion of this type. Furthermore, it is similarly possible for the at least one selection criterion to be a transportation vehicle type or a parameter of the transportation vehicle, for example, a type designation, a transportation vehicle class, external dimensions of the transportation vehicle, a door configuration (three-door transportation vehicle, five-door transportation vehicle, etc.), a tire state (summer tires/winter tires) or a loading state, etc.

In a further method operation at 104, the server 6 receives the transmitted current position of the motor vehicle via the communication connection 5. Where appropriate, the transmitted selection criterion is additionally received. In the next method operation at 105, the server 6 searches for stored trajectories on the basis of the received current position, wherein the stored trajectories must pass at least through a tolerance range around the received current position of the at least one motor vehicle 50. The trajectories may be stored on the server 6, for example, in a map which is provided with global position data. The server 6 then forms the tolerance range, for example, a surrounding area with a radius of 20 to 30 m around the received current position of the motor vehicle 50, and checks whether trajectories are stored which pass through this tolerance range. The radius of the tolerance range may also be selected as smaller and may amount to a few meters only, or even centimeters or decimeters only. The found trajectories are provided by the server 6.

The found trajectories may be restricted, where appropriate, by an additionally transmitted selection criterion. It is thus possible, for example, for only stored trajectories to which specified individualization information is allocated to be provided. In this way, it is possible for trajectories which are provided exclusively for a driver, a passenger or a transportation vehicle 49 to be allocated thereto. It is furthermore also possible for groups of trajectories of a plurality of drivers, passengers or transportation vehicles 49 to be formed, and for commonly used trajectories to be provided with corresponding individualization information. A provision of stored trajectories is also possible, for example, for guests who arrive with their motor vehicle 50 but are not familiar with the surrounding area on the property or in a multi-story car park. Trajectories which can be provided via corresponding individualization information for these guests only are then stored for a property or a multi-story car park. The management of trajectories is therefore designed to be more convenient and flexible.

The found and provided stored trajectories are transmitted in the next method operation at 106 from the server 6 via the communication connection 5 to the transportation vehicle device 1 of the motor vehicle 50.

In the following method operation at 107, the transportation vehicle device 1 receives the trajectories transmitted by the server 6 via the communication connection 5. It may be provided here that the trajectories are transmitted in their entirety, i.e., with all respectively stored further data. However, it may furthermore also be provided that only a part of the further data is transmitted and complete data are transmitted from the server to the transportation vehicle device only after a selection of a trajectory in the next method operation at 108, for the selected trajectory only.

In the next method operation at 108, the received at least one stored trajectory or, if a plurality of trajectories have been found, one of the plurality of received stored trajectories is selected. This can be performed automatically by the controller 2 on the basis of a selection parameter. It may be provided here that the selection parameter is a user interaction. For this purpose, the received trajectories are offered to a user, for example, the driver of the motor vehicle 50, for selection. This may be performed, for example, on a display and operating device. A display and operating device of this type may, for example, be a display and operating device of the motor vehicle 50, for example, a multimedia central console. However, a mobile display and operating device, for example, a Smartphone or a tablet computer, may also be used for this purpose.

It may be provided here, in the case of a plurality of found and transmitted trajectories which have a common section, for example, the same property driveway, but then branch off into different parking positions, that the plurality of trajectories are presented as a trajectory tree. A user can then select one of the trajectories or one of the branches of the trajectory tree and therefore a desired parking position via a corresponding user interaction on the display and operating device.

Once the selection has been made, the automated drive along the selected and provided trajectory is carried out in a final method operation at 109, whereby the controller 2 provides corresponding signals to control a longitudinal adjustment 51 and a transverse adjustment 52 of the motor vehicle 50. Once the parking position has been reached, the method is ended 110.

Figure 4:
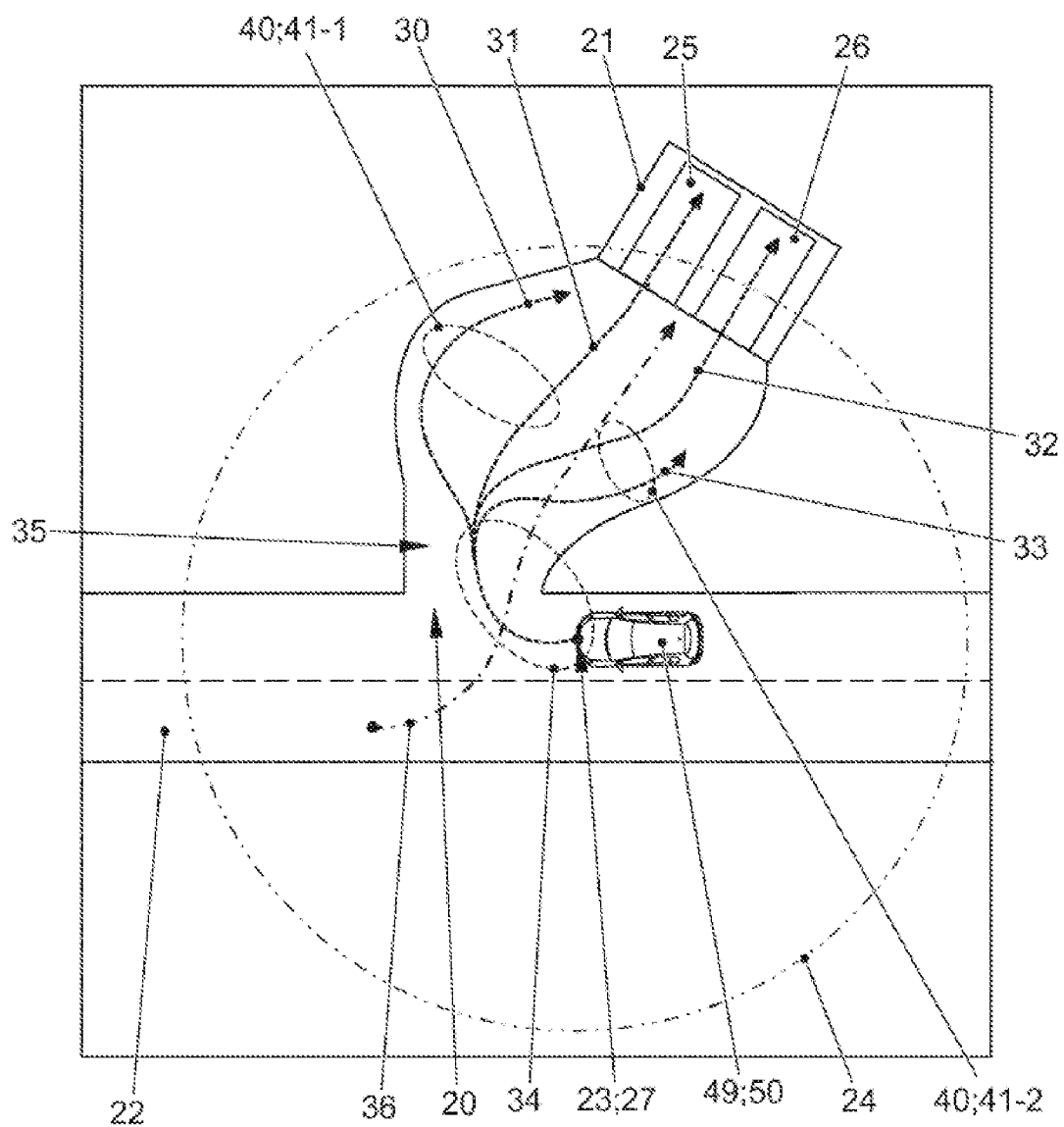
FIG. 4 shows a schematic representation of a property driveway and a double garage to illustrate the method.

FIG. 4 shows a schematic representation of a property driveway 20 and a double garage 21 to illustrate the method. A motor vehicle 50 is located on a road 22 in front of a property driveway 20. A current position 23 of the motor vehicle 50 is transmitted to the server 6 according to the method described above. The server 6 searches for stored trajectories 30, 31, 32, 33 around the current position 23 which pass through a tolerance range 24 and transmits them back to the motor vehicle 50. The stored trajectories 30, 31, 32, 33 may have their starting point 27 within the tolerance range 24. Some disclosed embodiments provide that the starting point 27 of the trajectories must be located in the tolerance range 24. In any event, it must be possible to "transfer" the vehicle 50 into the stored trajectories 30, 31, 32, 33 while driving exclusively in a drivable area, wherein a pose (position and orientation) of the motor vehicle 50 and other constraints, for example, a minimum turning circle of the motor vehicle 50, etc., must be taken into account. Other trajectories 36, for example, can also be used for the definition and validation of the drivable area. In this example, the other trajectory 36 defines, for example, a drivable area on the right-hand side of the garage entrance 22.

The transmitted trajectories 30, 31, 32, 33 all initially have, for example, a common section 34. The trajectories 30, 31, 32, 33 may therefore be combined to form a trajectory tree 35. When one of the trajectories 30, 31, 32, 33 is offered for selection on a display and operating device, the trajectories 30, 31, 32, 33 can then be presented, for example, as a trajectory tree 35.

The trajectories 30, 31, 32, 33 may be provided with a selection criterion 40, for example, individualization information 41-1, 41-2. Individualization information 41-1, 41-2 of this type may, for example, be an identifier of the motor vehicle 50. If the property and the double garage 21 belong, for example, to a married couple, the left-hand garage 25 can be allocated to the wife, whereas the right-hand garage 26 can be allocated to the husband. The trajectories 30, 31 can be provided accordingly with the individualization information 41-1 for the wife, whereas the trajectories 32, 33 can be provided with the individualization information 41-2 for the husband. If the respective individualization information 41-1, 41-2 is used as the selection criterion, only those trajectories 30, 31, 32, 33 to which the corresponding individualization information 41-1, 41-2 is allocated are found and provided by the server 6. If, for example, the individualization information 41-1 has been transmitted because the wife is located in her motor vehicle 50 in front of the property entrance 20, only the two trajectories 30, 31 as far as in front of or as far as into the left-hand garage 25 would be provided. Correspondingly, only the two trajectories 32, 33 as far as in front of or as far as into the right-hand garage 26 would be provided with the individualization information 41-2 for the husband. The benefit of individualization information 41-1, 41-2 of this type is that a better and individual management of the trajectories 30, 31, 32, 33 is possible. In addition, it is possible to allocate more than one individualization information element 41-1, 41-2 to a trajectory 30, 31, 32, 33.

It is furthermore possible for the selection criterion to be a state parameter. This may, for example, be a weather condition state. If the garage 21 is provided, for example, with a steep entrance, it may be desirable, in the event of black ice, not to park in the garage 21, but in front of the garage 21 instead, since an entry into or exit from the garage 21 is too dangerous or difficult. If a corresponding weather condition is identified, for example, by picking up corresponding signals on a temperature, rain and/or snow sensor in the motor vehicle 50, the corresponding state parameter is then transmitted to the server 6 and the server 6 exclusively provides trajectories 30, 33 outside the garage 21. In this way, the management of the stored trajectories 30, 31, 32, 33 can be improved, thereby increasing convenience and safety.

REFERENCE NUMBER LIST

1 Transportation vehicle device
2 Controller
3 Position-determining device
4 Communication device
5 Communication connection
6 Server
7 Buffer memory
10 System
20 Property driveway
21 Double garage
22 Road
23 Current position
24 Tolerance range
25 Left-hand garage
26 Right-hand garage
27 Starting point
30 Trajectory
31 Trajectory
32 Trajectory
33 Trajectory
34 Common section
35 Trajectory tree
36 Other trajectory
40 Selection criterion
41-1 Individualization information
41-2 Individualization information
49 Transportation Vehicle
50 Motor vehicle
51 Longitudinal adjustment
52 Transverse adjustment
100-110 Method operations

The invention claimed is:

1. A method for the automated driving of a transportation vehicle to approach a parking position, the method comprising:
providing at least one trajectory for a controller of the transportation vehicle; and
generating signals to control a movement of the transportation vehicle along the provided trajectory,
wherein the provision of the at least one trajectory comprises determining a current position of the transportation vehicle by a position-determining device, setting up a communication connection to a server outside the transportation vehicle by a communication device, transmitting the determined current position of the transportation vehicle to the server via the communication connection, and retrieving and receiving the at least one trajectory stored on the server via the communication connection, wherein the at least one trajectory retrieved and received from the server passes at least through a tolerance range around the determined current position of the transportation vehicle, and wherein the at least one trajectory includes a plurality of trajectories stored for an area around the determined current position of the transportation vehicle that have common sections and are combined by the server to form a trajectory tree, and wherein the plurality of trajectories are provided by the server and are transmitted to the transportation vehicle as the trajectory tree.

2. The method of claim 1, wherein at least one selection criterion is transmitted to the server in addition to the current position of the transportation vehicle.

3. The method of claim 2, wherein the at least one selection criterion comprises individualization information.

4. The method of claim 2, wherein the at least one selection criterion comprises a state parameter.

5. The method of claim 1, wherein one of the trajectories is selected by the controller depending on a selection parameter in response to a further trajectory being retrieved and received for the at least one retrieved and received trajectory.

6. The method of claim 5, wherein the selection parameter is derived from a detected user interaction, wherein the at least one retrieved and received trajectory and the further retrieved and received trajectory are offered to a user for selection before a detection of the user interaction.

7. The method of claim 1, wherein trajectory data of a trajectory of the transportation vehicle are acquired and are recorded by the controller and are transmitted via the communication connection to the server.

8. The method of claim 1, wherein the at least one trajectory received from the server is stored in a buffer memory in the transportation vehicle.

9. The method of claim 1, wherein each trajectory in the plurality trajectories corresponds to a respective parking position in the area.

10. A transportation vehicle device for a transportation vehicle for the automated driving of the transportation vehicle to approach a parking position, the transportation vehicle device comprising:
a controller which generates signals for controlling a movement of the transportation vehicle;
a position-determining device and a communication device, wherein the position-determining device determines the current position of the transportation vehicle, and
wherein the controller sets up a communication connection to a server outside the transportation vehicle via the communication device, to transmit the determined current position of the transportation vehicle to the server, and to retrieve and receive at least one trajectory stored on the server via the communication connection,
wherein the at least one trajectory retrieved and received from the server passes at least through a tolerance range around the determined current position of the transportation vehicle, and
wherein the at least one trajectory includes a plurality of trajectories stored for an area around the determined current position of the transportation vehicle that have common sections and are combined by the server to form a trajectory tree, and wherein the plurality of trajectories are provided by the server and are transmitted to the transportation vehicle as the trajectory tree.

11. The transportation vehicle of claim 10, wherein each trajectory in the plurality trajectories corresponds to a respective parking position in the area.

12. A method for operating a system for automated driving of at least one transportation vehicle comprising:
carrying out the method of claim 1 by at least one transportation vehicle; and
carrying out the following operations in a server:
receiving a current position of the at least one transportation vehicle via a communication connection to the at least one transportation vehicle,
searching for and providing at least one stored trajectory, wherein the provided at least one trajectory passes at least through a tolerance range around the received current position of the at least one transportation vehicle, and
transmitting the found and provided at least one stored trajectory via the communication connection to the at least one transportation vehicle,
wherein the provided at least one trajectory includes a plurality of trajectories stored for an area around the determined current position of the at least one transportation vehicle that have common sections and are combined by the server to form a trajectory tree, and wherein the plurality of trajectories are provided by the server and are transmitted to the at least one transportation vehicle as the trajectory tree.

13. The method of claim 12, wherein trajectory data are received by the server for a trajectory recorded in the at least one transportation vehicle and are stored in the server or a trajectory stored in the server is updated and/or supplemented by the received trajectory data.

14. The method of claim 12, wherein at least one selection criterion of the at least one transportation vehicle is received by the server and the search for and provision of the at least one stored trajectory are carried out depending on the received selection criterion.

15. The method of claim 12, wherein each trajectory in the plurality trajectories corresponds to a respective parking position in the area.

16. A system for the automated driving of a transportation vehicle to approach a parking position, the system comprising:
at least one transportation vehicle with the transportation vehicle device of claim 10, and
a server, wherein the server receives the determined current position of the at least one transportation vehicle via the communication connection, to search for and provide at least one stored trajectory, wherein the provided at least one trajectory passes at least through a tolerance range around the received current position of the at least one transportation vehicle, and transmits the provided at least one stored trajectory via the communication connection to the at least one transportation vehicle,
wherein the at least one trajectory includes a plurality of trajectories stored for an area around the determined current position of the at least one transportation vehicle that have common sections and are combined by the server to form a trajectory tree, and wherein the plurality of trajectories are provided by the server and are transmitted to the at least one transportation vehicle as the trajectory tree.

17. The system of claim 16, wherein each trajectory in the plurality trajectories corresponds to a respective parking position in the area.

* * * * *